(12) United States Patent
Quitmeyer et al.

(10) Patent No.: US 7,629,763 B2
(45) Date of Patent: Dec. 8, 2009

(54) ACTUATOR ASSEMBLY INCLUDING A SINGLE AXIS OF ROTATION LOCKING MEMBER

(75) Inventors: James N. Quitmeyer, Chandler, AZ (US); Dwayne M. Benson, Chandler, AZ (US); Kellan P. Geck, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 373 days.

(21) Appl. No.: 11/700,271

(22) Filed: Jan. 31, 2007

(65) Prior Publication Data

US 2008/0179971 A1 Jul. 31, 2008

(51) Int. Cl.
*G05B 19/19* (2006.01)
(52) U.S. Cl. ............... 318/568.11; 318/432; 318/568.2
(58) Field of Classification Search ............ 318/567, 318/568.11, 568.2, 432, 434
See application file for complete search history.

(56) References Cited

U.S. PATENT DOCUMENTS

| | | | |
|---|---|---|---|
| 3,082,607 A | 3/1963 | Sutton | |
| 3,568,804 A | 3/1971 | Olsen | |
| 3,638,507 A | 2/1972 | Orner | |
| 3,643,589 A | 2/1972 | Carter | |
| 4,806,068 A * | 2/1989 | Kohli et al. | 414/735 |
| 4,905,534 A | 3/1990 | Andonegui | |
| 5,209,194 A | 5/1993 | Adachi et al. | |
| 6,325,591 B1 * | 12/2001 | Focke et al. | 414/749.1 |
| 6,736,049 B2 | 5/2004 | Cautenet et al. | |
| 6,848,557 B2 | 2/2005 | Kapaan et al. | |
| 2005/0129495 A1 * | 6/2005 | Brogardh | 414/680 |
| 2006/0196292 A1 | 9/2006 | Tsou et al. | |

* cited by examiner

*Primary Examiner*—Rina I Duda
(74) *Attorney, Agent, or Firm*—Ingrassia Fisher & Lorenz, P.C.

(57) ABSTRACT

An actuator assembly including an actuator housing assembly and a single axis of rotation locking member fixedly attached to a portion of the actuator housing assembly and an external mounting structure. The single axis of rotation locking member restricting rotational movement of the actuator housing assembly about at least one axis. The single axis of rotation locking member is coupled at a first end to the actuator housing assembly about a Y axis and at a 90° angle to an X and Z axis providing rotation of the actuator housing assembly about the Y axis. The single axis of rotation locking member is coupled at a second end to a mounting structure, and more particularly a mounting pin, about an X axis and at a 90° angle to a Y and Z axis providing rotation of the actuator housing assembly about the X axis. The actuator assembly is thereby restricted from rotation about the Z axis.

17 Claims, 3 Drawing Sheets

ACTUATOR ASSEMBLY INCLUDING A SINGLE AXIS OF ROTATION LOCKING MEMBER

STATEMENT REGARDING FEDERALLY SPONSORED RESEARCH OR DEVELOPMENT

This invention was made with Government support under grant No. HQ0006-04-C-0004 awarded under the Kinetic Energy Interceptor (KEI) program by the Orbital Sciences Corporation. The Government has certain rights in this invention.

FIELD OF THE INVENTION

The present invention relates to actuators and, more particularly, to an actuator that is configured to resist significant amounts of rotational motion about the centerline of the bearings to which the actuator housing is mounted.

BACKGROUND OF THE INVENTION

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. One type of actuator that has been designed and implemented is a linear actuator. The actuator is driven by a rotary motor, such as certain types of electromechanical or rotary hydraulic actuators.

In many instances an electromechanical actuator (EMA) is mounted between two self aligning bearings, also known as spherical, monoball or rod end bearings. Many EMA configurations have the motor aligned with the linear line of action, which is parallel to a line between two self aligning bearings. As the actuator motor changes direction, an inertial torque is transferred to the actuator housing. When this occurs, the actuator housing may rotate within the self aligning bearings. This rotational movement can result in high impact loads should the actuator housing contact a mounting clevis that mounts the actuator housing to the vehicle. In actuator units having a slow response time (a long time to switch directions), this may not be a problem, or may be addressed with a limiting feature, such as a tang, located on the actuator housing next to one of the self aligning bearings. This limiting feature is formed close to a pivot point of the self-aligning bearings and often has a point or line of contact with the clevis. Although this limiting feature addresses the problem in a slow switching actuator, it does not allow for maximum torque capability and inherently has high impact loading when the actuator unit reverses direction at greater speeds. Accordingly, for high response systems (directional switching measured in number of times per second) a similar limiting feature located on the actuator housing does not solve the problem. Additionally, vibration or shock environments can also create high impact loading, due to the center of gravity of the actuator being offset form the line between the two self aligning bearings.

It should thus be appreciated from the above that it would be desirable to provide a compact and lightweight electromechanical actuator assembly that can withstand the relatively high magnitude shock and vibration levels present in high response systems. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

There has now been developed an actuator assembly, comprising: an actuator housing assembly; an actuator disposed at least partially within the actuator housing assembly; an external mount structure coupled to the actuator housing assembly; and at single axis of rotation locking member coupled to the actuator housing assembly and the external mount structure, the single axis of rotation locking member configured to restrict rotational movement of the actuator housing assembly about at least one of three orthogonal axes.

In yet another embodiment, there is provided an actuator assembly, comprising: an actuator housing assembly; a motor mounted in the actuator housing assembly, the motor adapted to receive position command signals and configured, upon receipt thereof, to supply a drive torque; a linear actuator mechanism disposed at least partially within the actuator housing assembly, the linear actuator mechanism coupled to receive the drive torque from the motor and configured, upon receipt thereof, to translate; a mount structure coupled to the actuator housing assembly; and a single axis of rotation locking member coupled to the actuator housing assembly and the mount structure, the single axis rotation locking member configured to restrict rotational movement of the actuator housing assembly about at least one of three orthogonal axes as a result of the drive force.

In a further embodiment, still by way of example only, there is provided a linear actuator assembly, comprising: an actuator housing assembly; a rotary motor mounted in the actuator housing assembly, the rotary motor adapted to receive position command signals and configured, upon receipt thereof, to supply a drive torque; a linear actuator mechanism mounted in the actuator housing assembly, the linear actuator mechanism coupled to receive the drive torque from the motor and configured, upon receipt thereof, to translate; a mount structure including a plurality of self aligning bearings, the actuator housing assembly mounted centered thereon; and a single axis of rotation locking member including a first end coupled to a the actuator housing assembly and a second end coupled to an external mounting structure via a mounting pin, the single axis rotation locking member configured to restrict rotational movement of the actuator housing assembly about at least one of three orthogonal axes.

Other independent features and advantages of the improved actuator assembly will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figure, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, before proceeding with the detailed description, it is to be appreciated that the described embodiment is not limited to use in conjunction with a specific vehicle or system. Thus, although the description is explicitly directed toward a specific application, it should be appreciated that it can be implemented in many types of vehicles and other actuation system designs, including those known now or hereafter in the art.

Figure 1:
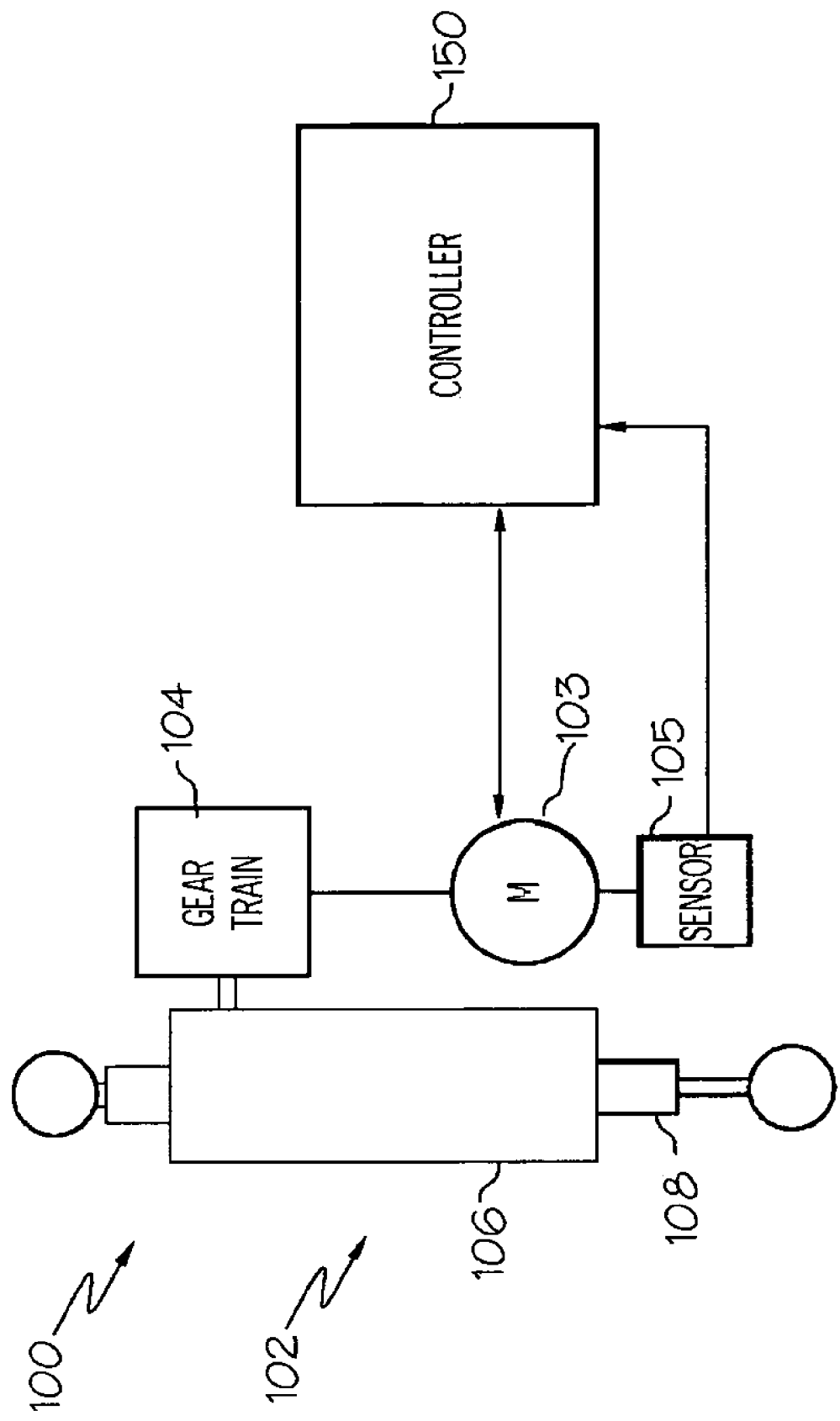
FIG. 1 is a block diagram of an exemplary actuation control system, including an actuator assembly according to the present invention.

Turning now to the description and with reference first to FIG. 1, a functional block diagram of an exemplary actuation control system 100 is shown. The system 100, which may be used, for example to control the position of a device or end effector, includes an actuator assembly 102 and a controller 150. The actuator assembly 102, which in this particular embodiment is preferably configured as a linear actuator, includes a motor 103, a gear train 104, and an optional position sensor 105. The motor 103 is coupled to the gear train 104, and is preferably implemented as a rotary motor, and more specifically an electric motor. It will be appreciated that the motor 103 may be any one of numerous types of AC or DC motors now known or developed in the future including, for example, an AC induction motor or a brushed DC motor. In a preferred embodiment, however, the motor 103 is implemented as a brushless DC motor. Although the motor 103 is preferably implemented as an electric motor, it will nonetheless be appreciated that the motor 103 could be implemented, if so desired, as any other type of rotary motor, such as a pneumatic or hydraulic motor.

No matter how the motor 103 is specifically implemented, it is configured, upon being properly energized and supplied with actuation position control signals, to rotate and thereby supply a rotational drive torque to the gear train 104. It is noted that the specific structure of the gear train 104 is not needed to understand or enable the claimed invention, nor is there a specific gear train structure that is considered to implement a best mode of the claimed invention. Accordingly, the details of the gear train 104 will not be described in detail. In response to the drive torque supplied from the motor 103, the gear train 104 transfers the drive torque to the ballscrew actuator assembly 106 which results in a linear motion of an actuator extension tube 108 to a desired position. This drive torque results in rotational movement of the actuator assembly 102 and results in high impact loads to portions of the actuator assembly 102 when switching directions.

Figure 2:
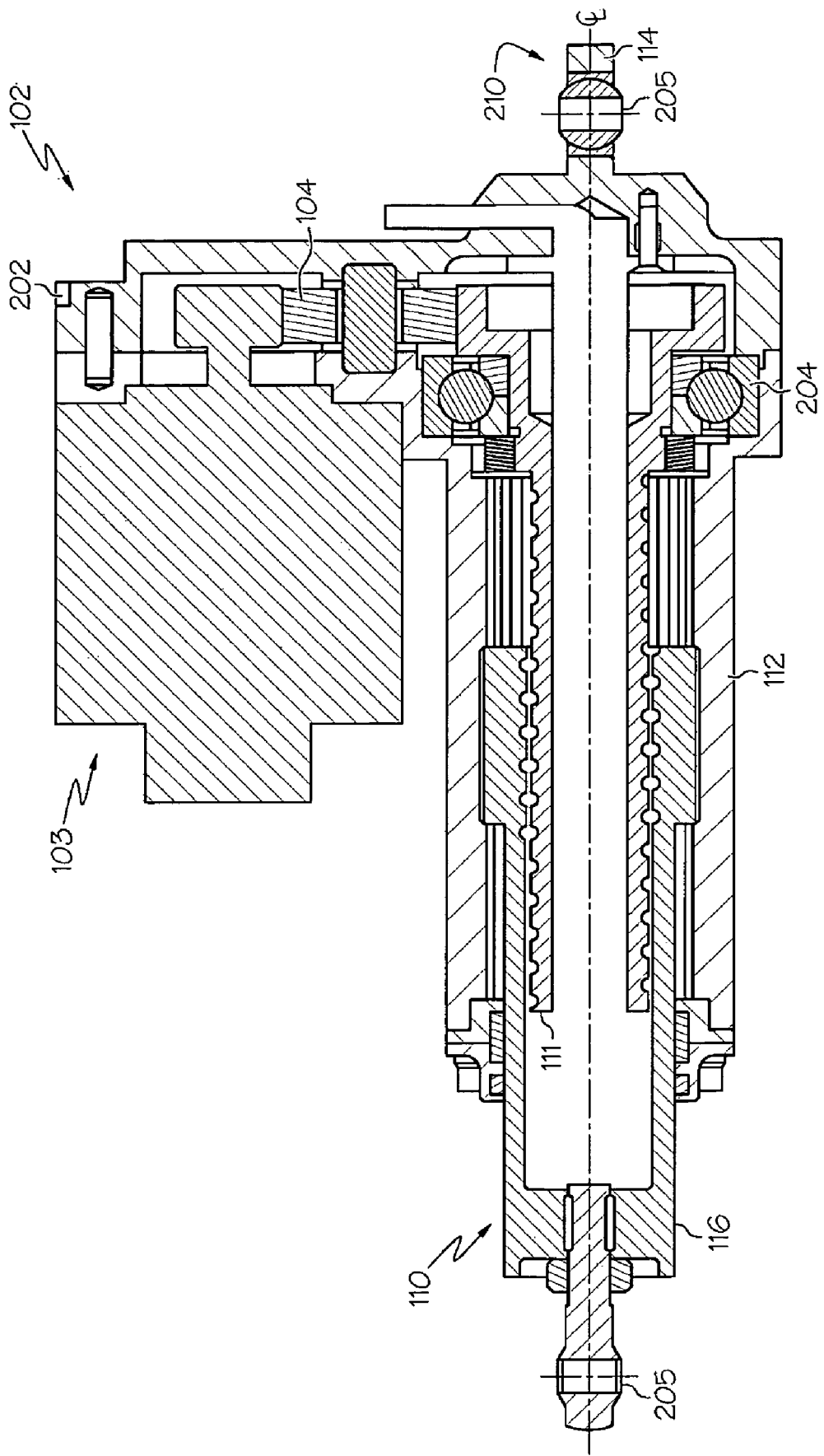
FIG. 2 is a cross-sectional view of an exemplary actuator assembly according to the present invention.
Figure 4:
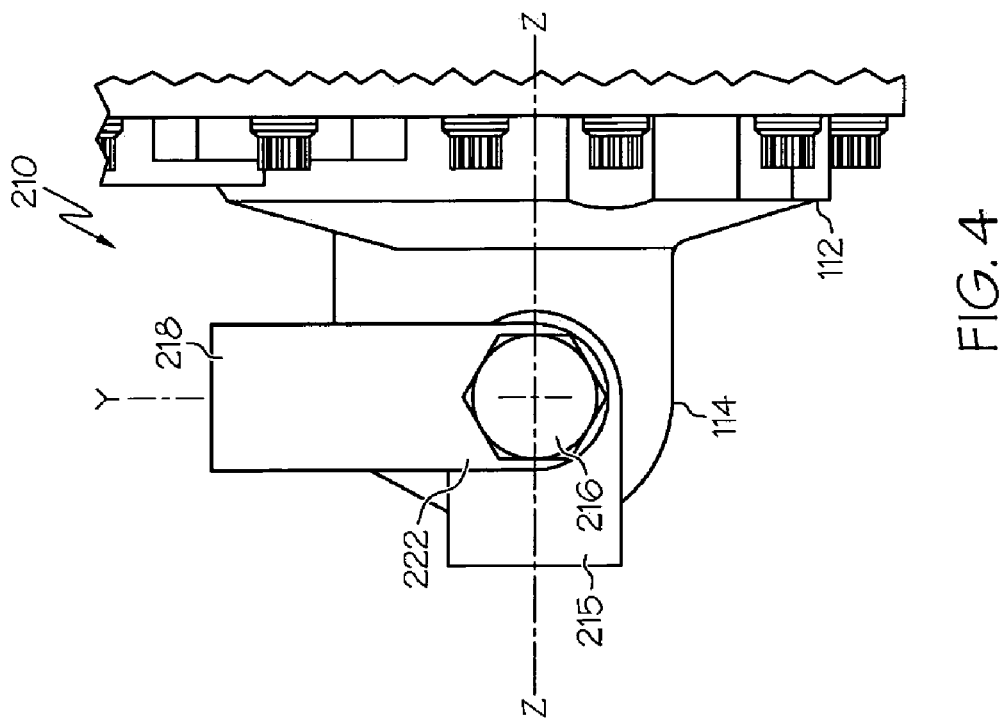
FIG. 4 is a side view of a portion of the actuator assembly according to the present invention.
Figure 3:
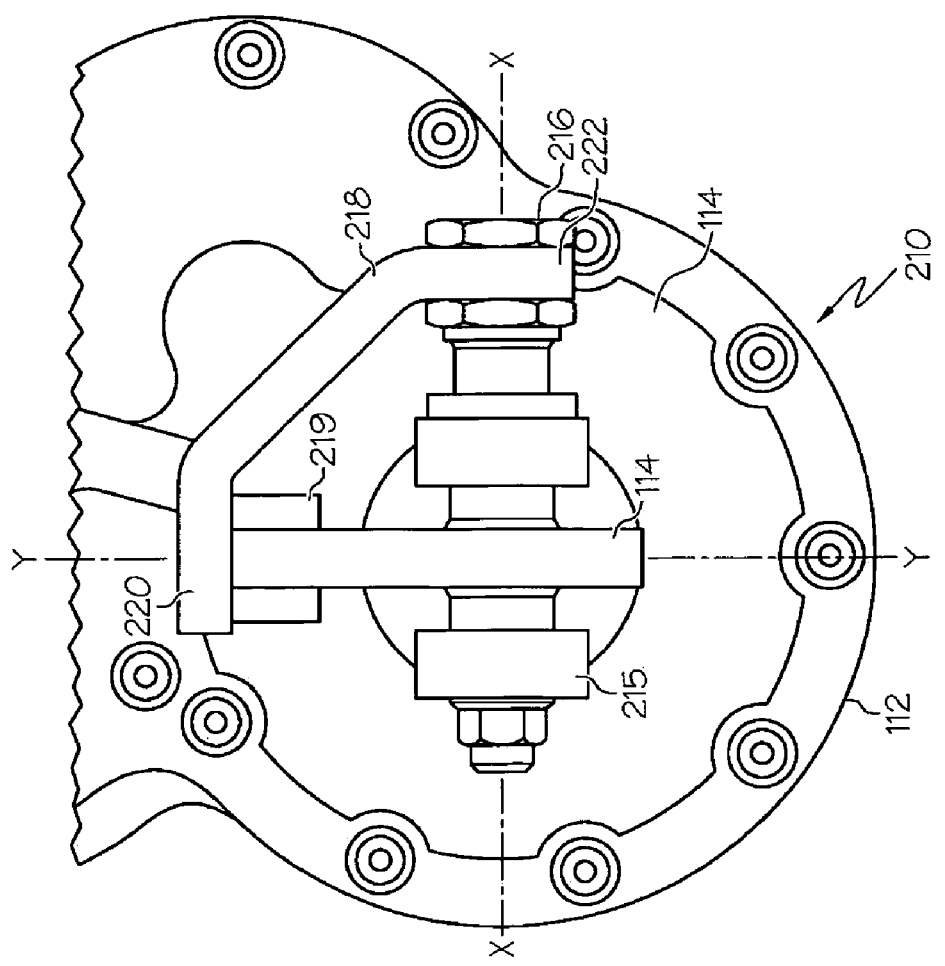
FIG. 3 is a top view of a portion of the actuator assembly according to the present invention.

Turning more specifically to FIGS. 2-4, although it should be understood that any type of linear actuator configuration is anticipated by this application, an embodiment of a particular preferred physical implementation of the actuator assembly 102 described above is shown in cross-section, and will now be described in more detail. FIG. 2 illustrates in a cross-sectional view, the actuator assembly 102. The actuator assembly 102 includes physical implementations of the various actuator components described with respect to FIG. 1, which for convenience are labeled using like reference numerals. In this particular embodiment, the depicted actuator assembly 102 is implemented with the motor 103 and the gear train 104 disposed within and supported on a single actuator housing assembly 202. The actuator housing assembly 202 completely encloses or supports each of the above-mentioned components, and includes a plurality of thrust bearings 204 that are used react to the linear loads on the actuator housing assembly 202. The thrust bearing 204 reacts to the axial loads on the extension tube 108 such that the loads are transferred to the actuator housing assembly 202 and to the self aligning bearing 205, and in turn to the fixed attachment structure (not shown).

Turning now to a description of the components mounted within or on the actuator housing assembly 202, it will be appreciated that the motor 103 functions, and is configured, as described above. The motor 103 receives position command signals from a controller (not shown) similar to the controller 150 of FIG. 1 to appropriately energize the stator and rotor. In response to the position command signals, the motor 103 rotates in the commanded direction to supply a rotational drive torque to the gear train 104.

The linear actuator assembly 102 typically provides linear motion via an actuator mechanism 110, such as a ball screw, Acme screw assembly, or rotational shaft. In this particular embodiment, the actuator assembly 102 includes a ballscrew actuator assembly, generally referenced 106. The ballscrew actuator assembly 106 includes an actuator output member 116, also referred to as an extension tube, and configured to move over a preset range, as graphically indicated in FIG. 2, during actuation. The actuator housing assembly 202 has formed as a part thereof, a mounting frame 112 which supports, amongst other components, the motor 103, and the gear train 104. The mounting frame 112 is provided with an actuator mounting flange 114 at a fixed end portion 210. A first self aligning bearing 205 is attached to the actuator mounting flange 114. The first self aligning bearing 205 allows the entire actuator assembly 102 to be mounted to the frame of a vehicle (not shown). A second self aligning bearing 205 is attached to the actuator output member 116. This second self aligning bearing 205 is attached to the control surface portion of the vehicle that is intended to be moved (not shown).

The actuator assembly 102 is mounted to a vehicle using a typical clevis structure and mounting pin (described below). During operation the motor 103 switches directions. The inertial torque generated from this switch in direction forces a rotational motion of the actuator housing assembly 202 about a center line of the self aligning bearings 205, indicated as CL. To restrict a portion of this rotational motion, the actuator mounting flange 114 is coupled to a locking member, which is described below, to restrict motion of the actuator housing assembly 202 about a single axis of rotation.

Referring now to FIGS. 3 and 4, illustrated in further detail is a top and side view, respectively, of the fixed end of the actuator housing assembly, generally referenced 210. As previously indicated, during mounting of the actuator 102 to a vehicle, the actuator housing assembly 202, and more particularly the end portion 210 is fixed to a mounting structure 215, such as a clevis, with a mounting pin 216, such as a combination bolt and nut, to restrict translational motion of the actuator housing assembly 202. The actuator housing assembly 202 is attached to the mounting pin 216 by the self-aligning bearing 205. The self aligning bearing 205 allows rotation about three axes, though limited in magnitude about two (Y and Z). Acceleration or inertial torque from the motor 103 will generate rotation of the actuator housing 202 about the Z axis, if only the self-aligning bearing 205 is used to attach the actuator housing assembly 202 to the mounting pin 216. In addition, the actuator mounting flange 114, and thus the actuator housing assembly 202, is fixedly positioned relative to the mounting structure 215 by a single axis of rotation locking member 218 and a sleeve bearing 219. It is anticipated in an alternate embodiment that a plurality of single axis of rotation locking members may be included in which one locking member is located on each end of the actuator assembly 102. As illustrated in FIGS. 3 and 4, the single axis of rotation locking member 218 fixedly positions the actuator mounting flange 114 to the mounting structure 215 and the actuator mounting pin 216, thereby restricting rotational motion about a single axis. In this particular embodiment, the single axis of rotation locking member 218 is formed as a quarter gimbal lock In a preferred embodiment, rotational movement of the actuator housing assembly 202, and more particularly the actuator assembly 102, is restricted about the Z axis, or the axis along the CL of the self-aligning bearing 205, as illustrated in FIG. 2, while movement is allowed about the X and Y axes. The inclusion of the single axis of rotation locking member 218 allows the self aligning bearing 205 to carry an axial load produced by the actuator assembly 102 along the Z axis, yet eliminates rotation of the actuator assembly 102 about the Z axis.

In this particular embodiment, the single axis of rotation locking member 218, and more particularly the sleeve bearing 219, is coupled at a first end 220 to the actuator housing assembly 202, and more particularly the mounting flange 114, about the Y axis and at a 90° angle to the X and Z axis. This fixation allows rotation of the actuator housing assembly 202 about the Y axis. The single axis of rotation locking member 218 is additionally attached at a second end 222 to the mounting pin 216 about the X axis and at a 90° angle to the Y and Z axis. This configuration allows rotation of the actuator housing assembly 202 about the X axis. The end of the rotational locking member 218, which is attached to the mounting pin 216, has sufficient clearance between the rotation locking member 218 and mounting pin 216, to allow the rotation locking member 218 to rotate about the mounting pin 216 and therefore also rotate about X axis. Accordingly, the single axis of rotation locking member 218 prohibits rotation about the Z axis, yet allows rotation about the X and Y axis. By restricting movement about the Z axis impact loads during directional switching may be reduced. In a preferred embodiment, the single axis of rotation locking member 218 is mounted at a relatively large distance from the pivot point of the self-aligning bearing 205 and may include bushings (not shown) at the pivot points. This mounting distance allows for greater torque capability and reduced impact loading.

While a particular actuator assembly 102 is described with respect to the preferred embodiment, it should be understood that any type of actuator assembly may implement the single axis of rotation locking member 218 of the present invention to fixedly attach the actuator housing assembly 202 to the mounting structure and restrict rotational motion about a single axis to decrease impact loads.

Accordingly, disclosed is an improved actuator assembly including a single axis of rotation locking member for the restriction of rotational motion about a single axis. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator assembly, comprising:
an actuator housing assembly;
an actuator disposed at least partially within the actuator housing assembly;
an external mount structure coupled to the actuator housing assembly; and
at single axis of rotation locking member coupled to the actuator housing assembly and the external mount structure, the single axis of rotation locking member configured to restrict rotational movement of the actuator housing assembly about at least one of three orthogonal axes.

2. The actuator assembly as claimed in claim 1, wherein the linear actuator further comprises a motor mounted in the actuator housing assembly, the motor adapted to receive a plurality of actuator position command signals and configured, upon receipt thereof, to supply a drive torque and a linear actuator mechanism mounted in the actuator housing assembly, the linear actuator mechanism coupled to receive the drive torque from the motor and configured, upon receipt thereof, to move in a linear manner.

3. The actuator assembly as claimed in claim 1, wherein the actuator housing assembly includes a mounting flange extending from an end portion thereof.

4. The actuator assembly as claimed in claim 3, wherein the mounting flange is coupled to the mounting structure with a mounting pin.

5. The actuator assembly as claimed in claim 4, wherein the single axis of rotation locking member is coupled at a first end to the mounting flange.

6. The actuator assembly as claimed in claim 5, wherein the single axis of rotation locking member is coupled at a first end to the mounting flange via a sleeve bearing.

7. The actuator assembly as claimed in claim 5, wherein the single axis of rotation locking member is coupled at second end to the mounting pin.

8. The actuator assembly as claimed in claim 5, further including a second single axis of rotation locking member having a first end coupled to an end portion of the actuator.

9. An actuator assembly, comprising:
- an actuator housing assembly;
- a motor mounted in the actuator housing assembly, the motor adapted to receive position command signals and configured, upon receipt thereof, to supply a drive force;
- a linear actuator mechanism disposed at least partially within the actuator housing assembly, the linear actuator mechanism coupled to receive the drive torque from the motor and configured, upon receipt thereof, to translate;
- a mount structure coupled to the actuator housing assembly; and
- a single axis of rotation locking member coupled to the actuator housing assembly and the mount structure, the single axis rotation locking member configured to restrict rotational movement of the actuator housing assembly about at least one of three orthogonal axes as a result of the drive force.

10. The actuator assembly of claim 9, wherein the actuator housing assembly is mounted on a plurality of self aligning bearings.

11. The actuator assembly of claim 9, wherein the actuator housing assembly further includes an actuator mounting flange.

12. The actuator assembly of claim 11, further including a mounting pin coupled to the actuator mounting flange, the external mounting structure, and the single axis of rotation locking member.

13. The actuator assembly of claim 11, wherein the single axis of rotation locking member includes a first end and a second end.

14. The actuator assembly of claim 12, wherein the first end of the a single axis of rotation locking member is fixedly attached to the actuator mounting flange and the second end of the single axis of rotation locking member is fixedly attached to the mounting structure via the mounting pin.

15. The actuator assembly of claim 12, wherein the single axis of rotation locking member is coupled at the first end to the mounting flange about an Y axis and at a 90° angle to an X and Z axis providing rotation of the actuator housing assembly about the Y axis.

16. The actuator assembly of claim 12, wherein the single axis of rotation locking member is coupled at the second end to the mounting pin about an X axis and at a 90° angle to a Y and Z axis providing rotation of the actuator housing assembly about the X axis.

17. The actuator assembly of claim 12, further including a second single axis of rotation locking member coupled to an end portion of the linear actuator mechanism.

* * * * *